US011424912B2

(12) United States Patent
Song et al.

(10) Patent No.: US 11,424,912 B2
(45) Date of Patent: Aug. 23, 2022

(54) METHOD AND DEVICE FOR PROVIDING BLOCKCHAIN NETWORK CAPABLE OF OPTIMIZING STORAGES OF RESPECTIVE NODES INCLUDED THEREIN

(71) Applicant: Metabora Co., Ltd., Seongnam-si (KR)

(72) Inventors: Gye Han Song, Seongnam-si (KR); I Goo Lee, Seoul (KR)

(73) Assignee: Metabora Co., Ltd., Seongnam-si (KR)

( * ) Notice: Subject to any disclaimer, the term of this patent is extended or adjusted under 35 U.S.C. 154(b) by 229 days.

(21) Appl. No.: 16/850,283

(22) Filed: Apr. 16, 2020

(65) Prior Publication Data

US 2020/0344044 A1 Oct. 29, 2020

(30) Foreign Application Priority Data

Apr. 25, 2019 (KR) .................. 10-2019-0048772

(51) Int. Cl.
*H04L 9/06* (2006.01)
*H04L 67/1095* (2022.01)
*H04L 9/00* (2022.01)

(52) U.S. Cl.
CPC .......... *H04L 9/0637* (2013.01); *H04L 9/0643* (2013.01); *H04L 67/1095* (2013.01); *H04L 9/50* (2022.05)

(58) Field of Classification Search
CPC . H04L 9/0637; H04L 9/0643; H04L 67/1095; H04L 2209/38; H04L 69/22;

(Continued)

(56) References Cited

U.S. PATENT DOCUMENTS

2011/0305401 A1* 12/2011 Lee .................. H04N 19/134
382/238
2016/0147797 A1* 5/2016 Dolph ................ G06F 16/2365
707/692

(Continued)

FOREIGN PATENT DOCUMENTS

JP 2017224017 A 12/2017
KR 20120074817 A 7/2012
KR 20180085570 A 7/2018

OTHER PUBLICATIONS

Russell, Luc; A Blockchain Experiment with Apache Kafka; Dec. 21, 2017; 12 pages; https://www.freecodecamp.org/news/a-blockchain-experiment-with-apache-kafka-97ee0ab6aefc/.

*Primary Examiner* — Abu S Sholeman
(74) *Attorney, Agent, or Firm* — Young Basile Hanlon & MacFarlane, P.C.

(57) ABSTRACT

A method for providing a blockchain network capable of optimizing storage used by service nodes in the blockchain network is provided. The method includes steps of: (a) a specific service node among the service nodes, wherein the specific service node is configured to optimize its storage if one of optimization conditions is satisfied, generating blocks while synchronizing with other service nodes; and (b) the specific service node (b1) determining whether one of the optimization conditions is satisfied, by referring to one of (i) (i-1) a latest-block number of a latest block among the blocks and (i-2) a predetermined threshold number, and (ii) a predetermined threshold time and (b2) if one of the optimization conditions is satisfied, applying storage-optimizing operation to information on transactions in target blocks which are part of the blocks not optimized, wherein the target blocks are determined by referring to one of (i) and (ii).

28 Claims, 6 Drawing Sheets

(58) Field of Classification Search
CPC ... H04L 9/3297; H04L 67/104; H04L 9/3239; G06F 16/2365; G06F 16/2372; G06F 16/27

See application file for complete search history.

(56) References Cited

U.S. PATENT DOCUMENTS

| | | | |
|---|---|---|---|
| 2016/0261791 A1* | 9/2016 | Satoyoshi | G01B 11/00 |
| 2018/0115428 A1* | 4/2018 | Lysenko | H04L 9/0637 |
| 2020/0344044 A1* | 10/2020 | Song | H04L 9/3239 |
| 2021/0041499 A1* | 2/2021 | Ghosal | G06F 11/076 |

* cited by examiner

METHOD AND DEVICE FOR PROVIDING BLOCKCHAIN NETWORK CAPABLE OF OPTIMIZING STORAGES OF RESPECTIVE NODES INCLUDED THEREIN

CROSS-REFERENCE TO RELATED APPLICATION

This application claims priority to Korean Application Patent Serial No. 10-2019-0048772, filed Apr. 25, 2019, the entire disclosure of which is hereby incorporated by reference.

TECHNICAL FIELD

The present disclosure relates to a method for providing a blockchain network capable of automatically optimizing storage used by each of service nodes, and a specific service node among the service nodes using the same.

BACKGROUND

Blockchain technology is a technology aimed to prevent data tampering based on distributed computing technology, by storing target data in blocks, which is a chain-distributed data store based on a P2P method.

When using such blockchain technology, each node includes all blocks from when the blockchain network was first started. The problem in this case is that since the blocks increase endlessly, storage space of each node may become insufficient.

Such a problem may be more critical if the blockchain network is a private network. In the case of a public network it may be necessary to store data from the first block to guarantee a reliability of the data, however, in the case of the private network, the importance of each piece the data often changes over time according to its time of generation. Specifically, when the life cycle of the data required by a service running on the private network reaches an end, then the data becomes useless, and its indefinite storage is inefficient.

Despite such problems, it seems true that not a lot of research has been done to optimize the storage space of each node because of the common notion that each node in the blockchain network should contain all the blocks.

As a prior art, as can be seen on a web page https://medium.freecodecamp.org/a-blockchain-experiment-with-apache-kafka-97ee0ab6aefc, in 2017, Luc Russel presented a configuration of storing the blocks separately in a partition called Kafka. However, this approach is from a perspective of the scalability, not from a perspective of optimizing the size, that is, the storage space, and is also far from deleting the blocks permanently.

SUMMARY

It is an object of the present disclosure to solve all the aforementioned problems.

It is another object of the present disclosure to provide a blockchain network capable of automatically optimizing storage used by each of one or more service nodes, to thereby allow each of the service nodes to delete data whose data life cycle is expired on a service provided on the blockchain network.

It is still another object of the present disclosure to provide a method for applying at least one storage-optimizing operation to information on one or more transactions included in one or more target blocks or to the target blocks per se, to thereby allow a user to choose the method for applying the storage-optimizing operation for his/her use.

It is still yet another object of the present disclosure to provide a method for linking fingerprint function-value information to be used for establishing relationship with previous blocks, as well as the method for applying the storage-optimizing operation to the target blocks per se, to thereby optimize the storage and guarantee a reliability of the data.

In accordance with one aspect of the present disclosure, there is provided a method for providing a blockchain network capable of optimizing storage used by one or more service nodes in the blockchain network, including steps of: (a) a specific service node among the service nodes, included in the blockchain network wherein the specific service node is configured to optimize its own storage if one of one or more optimization conditions is satisfied, performing or supporting another device to perform a process of generating blocks while performing synchronization with one or more other service nodes included in the blockchain network; and (b) the specific service node performing or supporting another device to perform (b1) a process of determining whether one of the optimization conditions is satisfied, by referring to one of (i) (i-1) a latest-block number of a latest block among the blocks and (i-2) a predetermined threshold number, and (ii) a predetermined threshold time and (b2) if one of the optimization conditions is determined as satisfied, a process of applying at least one storage-optimizing operation to information on one or more transactions included in one or more target blocks which are at least part of the blocks having not been optimized, wherein the target blocks are determined by referring to one of said (i) and said (ii).

As one example, at the step of (a), the specific service node performs or supports another device to perform a process of generating a 1-st new block corresponding to a 1-st new-block number while performing the synchronization wherein the 1-st new block is a block subsequent to the latest block, and wherein, at the step of (b), the specific service node performs or supports another device to perform (i) a process of determining one of the optimization conditions as satisfied if a difference between the 1-st new-block number and a latest optimized-block number of a latest optimized block is determined as same as or greater than the predetermined threshold number wherein the latest optimized block is a latest one among optimized blocks to which the storage-optimization operation has been applied, and (ii) if one of the optimization conditions is determined as satisfied, a process of selecting the target blocks, which are to be optimized, among the blocks stored therein, by referring to the 1-st new-block number and the predetermined threshold number, and then, and (iii) while maintaining header information of the target blocks, wherein the header information of the target blocks includes at least part of blockchain version information, function-value information on its corresponding preceding block, specific-tree function-value information, block-creation time information, nonce information, and block-mining difficulty information, a process of applying the storage-optimizing operation to the target blocks by (iii-1) deleting the information on the transactions included in the target blocks or (iii-2) deleting the information on the transactions included in the target blocks and transmitting the information on the transactions included in the target blocks to other storage, to thereby generate the optimized blocks.

As one example, after the step of (b), if a 2-nd new block is created while the synchronization with said other service nodes is performed, wherein the 2-nd new block is a block subsequent to the 1-st new block, the specific service node performs or supports another device to perform (i) a process of selecting at least one new target block, which is to be optimized, by referring to a 2-nd new-block number of the 2-nd new block and the predetermined threshold number and (ii) a process of applying the storage-optimizing operation to the new target block.

As one example, if an N-th block is created as the 1-st new block while the synchronization with said other service nodes is performed, wherein N is an integer corresponding to the 1-st new-block number, the specific service node performs or supports another device to perform (i) a process of selecting an (N−K)-th block as one of the target blocks wherein K is an integer corresponding to the predetermined threshold number, (ii) a process of applying the storage-optimizing operation to the (N−K)-th block, (iii) a process of generating an (N+1)-th block as the 2-nd new block while performing the synchronization with said other service nodes, and (iv) a process of selecting an (N−K+1)-th block as the new target block and applying the storage-optimizing operation to the new target block.

As one example, at the step of (b), if one or more unoptimized blocks, to which the storage-optimizing operation is not applied, are determined as present among one or more preceding blocks created before a reference time corresponding to the predetermined threshold time backward from a current point of time, the specific service node performs or supports another device to perform a process of determining one of the optimization conditions as satisfied and a process of selecting the unoptimized blocks as the target blocks.

As one example, at the step of (b), if one of the optimization conditions is determined as satisfied, the specific service node performs or supports another device to perform (i) a process of selecting the target blocks among the blocks stored therein, such that a ratio of (i-1) the number of one or more unoptimized blocks, to which the storage-optimizing operation is not applied, among the blocks stored therein to (i-2) the predetermined threshold number is less than or equal to a preset value, and (ii) a process of applying the storage-optimizing operation to the target blocks.

In accordance with another aspect of the present disclosure, there is provided a method for providing a blockchain network capable of optimizing storage used by one or more service nodes in the blockchain network, including steps of: (a) a specific service node among the service nodes, included in the blockchain network wherein the specific service node is configured to optimize its own storage if one of one or more optimization conditions is satisfied, performing or supporting another device to perform a process of generating blocks while performing synchronization with one or more other service nodes included in the blockchain network; and (b) the specific service node performing or supporting another device to perform (b1) a process of determining whether one of the optimization conditions is satisfied, by referring to one of (i) (i-1) a latest-block number of a latest block among the blocks and (i-2) a predetermined threshold number, and (ii) a predetermined threshold time and (b2) if one of the optimization conditions is determined as satisfied, a process of applying at least one storage-optimizing operation to one or more target blocks and a process of generating or updating a genesis block that is a replacement block, which replaces a latest one of the target blocks as subjects to which the storage-optimizing operation is applied, the genesis block serving as a seed block capable of defining relationship between the target blocks and a first one of untargeted blocks, wherein the replacement block includes information on the target blocks, wherein the first one of the untargeted blocks is a block subsequent to the target blocks, and wherein the target blocks are determined by referring to one of said (i) and said (ii).

As one example, at the step of (a), the specific service node performs or supports another device to perform a process of generating a 1-st new block corresponding to a 1-st new-block number while performing the synchronization wherein the 1-st new block is a block subsequent to the latest block, and wherein, at the step of (b), the specific service node performs or supports another device to perform (i) a process of determining one of the optimization conditions as satisfied if a difference between the 1-st new-block number and a latest optimized-block number of a latest optimized block is determined as same as or greater than the predetermined threshold number wherein the latest optimized block is a latest one among optimized blocks to which the storage-optimization operation has been applied, (ii) if one of the optimization conditions is determined as satisfied, a process of selecting the target blocks, which are to be optimized, among the blocks stored therein, by referring to the 1-st new-block number and the predetermined threshold number, (iii) a process of applying the storage-optimizing operation to the target blocks by (iii-1) deleting the information on the target blocks or (iii-2) deleting the information on the target blocks and transmitting the information on the target blocks to other storage, and (iv) a process of updating the information on the genesis block by referring the to information on the target blocks.

As one example, the specific service node performs or supports another device to perform (i) a process of updating the information on the genesis block, (ii) a process of storing the target blocks in a buffer with a predetermined size while a preset number of one or more new blocks are created and (iii) one of (iii-1) a process of deleting the target blocks and (iii-2) a process of deleting the target blocks from itself and transmitting the target blocks to other storage.

As one example, if a 2-nd new block is created while the synchronization with said other service nodes is performed wherein the 2-nd new block is a block subsequent to the 1-st new block, the specific service node performs or supports another device to perform (i) a process of selecting at least one new target block, which is to be optimized, by referring to a 2-nd new-block number of the 2-nd new block and the predetermined threshold number and (ii) a process of applying the storage-optimizing operation to the new target block, and then storing the new target block in the buffer.

As one example, if a new node is added to the blockchain network, the specific service node performs or supports another device to perform (i) a process of providing the new node with the information on the genesis block whose state is updated by referring to information on an N-th block, (ii) a process of providing the new node with information on an (N+1)-th block to an (N+P)-th block stored in the buffer, while performing synchronization with the new node wherein P is an integer less than or equal to the predetermined size of the buffer, to thereby allow the new node to be synchronized based on the information on the genesis block whose state is updated by referring to the information on the N-th block, despite the storage-optimizing operation.

As one example, at the step of (a), if a specific block is created while the synchronization with said other service nodes is performed, the specific service node allows fingerprint function-value information on the specific block to be incorporated into header information of the specific block, and wherein the fingerprint function-value information on the specific block is created by referring to (i) block function-value information on the specific block and (ii) fingerprint function-value information on its corresponding at least one of preceding blocks, wherein the fingerprint function-value information on said its corresponding at least one of the preceding blocks is created by referring to the block function-value information on at least part of the preceding blocks.

As one example, while an N-th block is created while the synchronization with said other service nodes is performed, wherein N is an integer, the specific service node allows fingerprint function-value information on the N-th block to be incorporated into header information of the N-th block, and $$F_N = \text{func}_s(F_{N-1} + H_N) \times s_N$$

wherein the fingerprint function-value information on the N-th block is created according to the equation above, and in the equation, $F_N$ represents the fingerprint function-value information on the N-th block, $F_{N-1}$ represents fingerprint function-value information on an (N−1)-th block, $H_N$ represents block function-value information on the N-th block, $s_N$ represents a salt value corresponding to the fingerprint function-value information on the N-th block, and the specific function $\text{func}_s$ represents a predetermined function which (i) accepts the fingerprint function-value information on the (N−1)-th block and the block function-value information on the N-th block as its input and (ii) outputs a function value, and wherein fingerprint function-value information on a 1-st block is created by referring to block function-value information on the 1-st block.

As one example, at the step of (b), if the specific block is selected as one of the target blocks, the specific service node performs or supports another device to perform a process of updating the information on the genesis block via the storage-optimizing operation by further referring to information on the specific block including the fingerprint function-value information on the specific block.

As one example, the specific service node provides fingerprint function-value information on the genesis block, included in the information on the genesis block, to each of said other service nodes, to thereby support each of said other service nodes to verify as to whether each piece of data included in each of the service nodes originates from a same data chain as that of the specific service node.

As one example, at the step of (b), the specific service node performs or supports another device to perform (i) a process of selecting the target blocks, which are to be optimized, whose block numbers are continuous, such that a ratio of (i-1) the number of one or more unoptimized blocks, to which the storage-optimizing operation is not applied, among the blocks stored therein to (i-2) the predetermined threshold number is less than or equal to a preset value, (ii) a process of executing the storage-optimizing operation by (ii-1) deleting the target blocks, and (ii-2) selecting a latest target block whose block number is largest among the target blocks, and (iii) a process of updating the information on the genesis block by referring to information on the target blocks.

In accordance with still another aspect of the present disclosure, there is provided a specific service node among one or more service nodes, included in a blockchain network wherein the specific service node is configured to optimize its own storage if one of one or more optimization conditions is satisfied, for providing the blockchain network capable of optimizing storage used by the service nodes in the blockchain network, including: at least one memory that stores instructions; and at least one processor configured to execute the instructions to perform or support another device to perform: (I) a process of generating blocks while performing synchronization with one or more other service nodes included in the blockchain network, and (II) (II-1) a process of determining whether one of the optimization conditions is satisfied, by referring to one of (i) (i-1) a latest-block number of a latest block among the blocks and (i-2) a predetermined threshold number, and (ii) a predetermined threshold time and (II-2) if one of the optimization conditions is determined as satisfied, a process of applying at least one storage-optimizing operation to information on one or more transactions included in one or more target blocks which are at least part of the blocks having not been optimized, wherein the target blocks are determined by referring to one of said (i) and said (ii).

As one example, at the process of (I), the processor performs or supports another device to perform a process of generating a 1-st new block corresponding to a 1-st new-block number while performing the synchronization wherein the 1-st new block is a block subsequent to the latest block, and wherein, at the process of (II), the processor performs or supports another device to perform (i) a process of determining one of the optimization conditions as satisfied if a difference between the 1-st new-block number and a latest optimized-block number of a latest optimized block is determined as same as or greater than the predetermined threshold number wherein the latest optimized block is a latest one among optimized blocks to which the storage-optimization operation has been applied, and (ii) if one of the optimization conditions is determined as satisfied, a process of selecting the target blocks, which are to be optimized, among the blocks stored therein, by referring to the 1-st new-block number and the predetermined threshold number, and then, and (iii) while maintaining header information of the target blocks, wherein the header information of the target blocks includes at least part of blockchain version information, function-value information on its corresponding preceding block, specific-tree function-value information, block-creation time information, nonce information, and block-mining difficulty information, a process of applying the storage-optimizing operation to the target blocks by (iii-1) deleting the information on the transactions included in the target blocks or (iii-2) deleting the information on the transactions included in the target blocks and transmitting the information on the transactions included in the target blocks to other storage, to thereby generate the optimized blocks.

As one example, after the process of (II), if a 2-nd new block is created while the synchronization with said other service nodes is performed, wherein the 2-nd new block is a block subsequent to the 1-st new block, the processor performs or supports another device to perform (i) a process of selecting at least one new target block, which is to be optimized, by referring to a 2-nd new-block number of the 2-nd new block and the predetermined threshold number and (ii) a process of applying the storage-optimizing operation to the new target block.

As one example, if an N-th block is created as the 1-st new block while the synchronization with said other service nodes is performed, wherein N is an integer corresponding to the 1-st new-block number, the processor performs or supports another device to perform (i) a process of selecting an (N−K)-th block as one of the target blocks wherein K is an integer corresponding to the predetermined threshold number, (ii) a process of applying the storage-optimizing operation to the (N−K)-th block, (iii) a process of generating an (N+1)-th block as the 2-nd new block while performing the synchronization with said other service nodes, and (iv) a process of selecting an (N−K+1)-th block as the new target block and applying the storage-optimizing operation to the new target block.

As one example, at the process of (II), if one or more unoptimized blocks, to which the storage-optimizing operation is not applied, are determined as present among one or more preceding blocks created before a reference time corresponding to the predetermined threshold time backward from a current point of time, the processor performs or supports another device to perform a process of determining one of the optimization conditions as satisfied and a process of selecting the unoptimized blocks as the target blocks.

As one example, at the process of (II), if one of the optimization conditions is determined as satisfied, the processor performs or supports another device to perform (i) a process of selecting the target blocks among the blocks stored therein, such that a ratio of (i-1) the number of one or more unoptimized blocks, to which the storage-optimizing operation is not applied, among the blocks stored therein to (i-2) the predetermined threshold number is less than or equal to a preset value, and (ii) a process of applying the storage-optimizing operation to the target blocks.

In accordance with still yet another aspect of the present disclosure, there is provided a specific service node among one or more service nodes, included in a blockchain network wherein the specific service node is configured to optimize its own storage if one of one or more optimization conditions is satisfied, for providing the blockchain network capable of optimizing storage used by the service nodes in the blockchain network, including: at least one memory that stores instructions; and at least one processor configured to execute the instructions to perform or support another device to perform: (I) a process of generating blocks while performing synchronization with one or more other service nodes included in the blockchain network, and (II) (II-1) a process of determining whether one of the optimization conditions is satisfied, by referring to one of (i) (i-1) a latest-block number of a latest block among the blocks and (i-2) a predetermined threshold number, and (ii) a predetermined threshold time and (II-2) if one of the optimization conditions is determined as satisfied, a process of applying at least one storage-optimizing operation to one or more target blocks and a process of generating or updating a genesis block that is a replacement block, which replaces a latest one of the target blocks as subjects to which the storage-optimizing operation is applied, the genesis block serving as a seed block capable of defining relationship between the target blocks and a first one of untargeted blocks, wherein the replacement block includes information on the target blocks, wherein the first one of the untargeted blocks is a block subsequent to the target blocks, and wherein the target blocks are determined by referring to one of said (i) and said (ii).

As one example, at the process of (I), the processor performs or supports another device to perform a process of generating a 1-st new block corresponding to a 1-st new-block number while performing the synchronization wherein the 1-st new block is a block subsequent to the latest block, and wherein, at the process of (II), the processor performs or supports another device to perform (i) a process of determining one of the optimization conditions as satisfied if a difference between the 1-st new-block number and a latest optimized-block number of a latest optimized block is determined as same as or greater than the predetermined threshold number wherein the latest optimized block is a latest one among optimized blocks to which the storage-optimization operation has been applied, (ii) if one of the optimization conditions is determined as satisfied, a process of selecting the target blocks, which are to be optimized, among the blocks stored therein, by referring to the 1-st new-block number and the predetermined threshold number, (iii) a process of applying the storage-optimizing operation to the target blocks by (iii-1) deleting the information on the target blocks or (iii-2) deleting the information on the target blocks and transmitting the information on the target blocks to other storage, and (iv) a process of updating the information on the genesis block by referring the to information on the target blocks.

As one example, the processor performs or supports another device to perform (i) a process of updating the information on the genesis block, (ii) a process of storing the target blocks in a buffer with a predetermined size while a preset number of one or more new blocks are created and (iii) one of (iii-1) a process of deleting the target blocks and (iii-2) a process of deleting the target blocks from itself and transmitting the target blocks to other storage.

As one example, if a 2-nd new block is created while the synchronization with said other service nodes is performed wherein the 2-nd new block is a block subsequent to the 1-st new block, the processor performs or supports another device to perform (i) a process of selecting at least one new target block, which is to be optimized, by referring to a 2-nd new-block number of the 2-nd new block and the predetermined threshold number and (ii) a process of applying the storage-optimizing operation to the new target block, and then storing the new target block in the buffer.

As one example, if a new node is added to the blockchain network, the processor performs or supports another device to perform (i) a process of providing the new node with the information on the genesis block whose state is updated by referring to information on an N-th block, (ii) a process of providing the new node with information on an (N+1)-th block to an (N+P)-th block stored in the buffer, while performing synchronization with the new node wherein P is an integer less than or equal to the predetermined size of the buffer, to thereby allow the new node to be synchronized based on the information on the genesis block whose state is updated by referring to the information on the N-th block, despite the storage-optimizing operation.

As one example, at the process of (I), if a specific block is created while the synchronization with said other service nodes is performed, the processor allows fingerprint function-value information on the specific block to be incorporated into header information of the specific block, and wherein the fingerprint function-value information on the specific block is created by referring to (i) block function-value information on the specific block and (ii) fingerprint function-value information on its corresponding at least one of preceding blocks, wherein the fingerprint function-value information on said its corresponding at least one of the preceding blocks is created by referring to the block function-value information on at least part of the preceding blocks.

As one example, while an N-th block is created while the synchronization with said other service nodes is performed, wherein N is an integer, the processor allows fingerprint function-value information on the N-th block to be incorporated into header information of the N-th block, and $$F_N = \text{func}_s(F_{N-1} + H_N) \times s_N$$

wherein the fingerprint function-value information on the N-th block is created according to the equation above, and in the equation, $F_N$ represents the fingerprint function-value information on the N-th block, $F_{N-1}$ represents fingerprint function-value information on an (N−1)-th block, $H_N$ represents block function-value information on the N-th block, $s_N$ represents a salt value corresponding to the fingerprint function-value information on the N-th block, and the specific function $func_s$ represents a predetermined function which (i) accepts the fingerprint function-value information on the (N−1)-th block and the block function-value information on the N-th block as its input and (ii) outputs a function value, and wherein fingerprint function-value information on a 1-st block is created by referring to block function-value information on the 1-st block.

As one example, at the process of (II), if the specific block is selected as one of the target blocks, the processor performs or supports another device to perform a process of updating the information on the genesis block via the storage-optimizing operation by further referring to information on the specific block including the fingerprint function-value information on the specific block.

As one example, the processor provides fingerprint function-value information on the genesis block, included in the information on the genesis block, to each of said other service nodes, to thereby support each of said other service nodes to verify as to whether each piece of data included in each of the service nodes originates from a same data chain as that of the specific service node.

As one example, at the process of (II), the processor performs or supports another device to perform (i) a process of selecting the target blocks, which are to be optimized, whose block numbers are continuous, such that a ratio of (i-1) the number of one or more unoptimized blocks, to which the storage-optimizing operation is not applied, among the blocks stored therein to (i-2) the predetermined threshold number is less than or equal to a preset value, (ii) a process of executing the storage-optimizing operation by (ii-1) deleting the target blocks, and (ii-2) selecting a latest target block whose block number is largest among the target blocks, and (iii) a process of updating the information on the genesis block by referring to information on the target blocks.

In order to accomplish objects above and characteristic effects to be described later of the present disclosure, distinctive structures of the present disclosure are described as follows.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION

Figure 1:
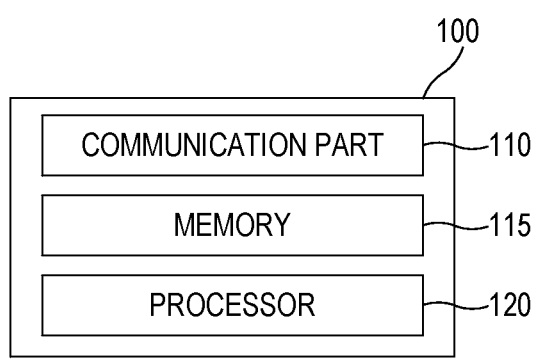
FIG. 1 is a drawing schematically illustrating a specific service node included in a blockchain network capable of automatically optimizing storage used by each of one or more service nodes in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Also, throughout the present disclosure, a specific function may be a hash function, a function value may be a hash value generated by using the hash function, a specific operation may be a hash operation, a specific tree may be a Merkle tree or a Patricia tree, and a representative function value of the specific tree may be a root value of the Merkle tree, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a specific service node included in a blockchain network capable of automatically optimizing storage used by each of one or more service nodes in accordance with one example embodiment of the present disclosure.

By referring to FIG. 1, the specific service node 100 may include a communication part 110, a memory 115, and a processor 120. Herein, processes of inputs/outputs, and operations of the specific service node 100 may be respectively performed by the communication part 110 and the processor 120. However, detailed connections between the communication part 110 and the processor 120 are omitted in FIG. 1. Herein, the memory 115 may already have stored the instructions to be described later. And the processor 120 may be configured to perform the instructions stored in the memory 115, and may execute processes to be described later, to thereby perform the present disclosure. However, such description of the specific service node 100 does not exclude a configuration of an integrated processor into which a medium, a processor, and a memory are integrated in order to implement the present disclosure.

The specific service node 100 as such may perform a 1-st storage-optimizing operation or a 2-nd storage-optimizing operation depending on example embodiments. First, one example embodiment of performing the 1-st storage-optimizing operation is described.

The specific service node 100 which performs the 1-st storage-optimizing operation may be included in the blockchain network, and may have been configured to optimize the storage of itself if one of one or more optimization conditions is satisfied. One of the optimization conditions may correspond to a case where it is determined that reduction of used storage is required due to an excess number of blocks included in the specific service node 100. The specific service node 100 may perform or support another device to perform a process of creating each of blocks while performing a synchronization with each of one or more other service nodes included in the blockchain network, and, during such a process, may determine whether one of the optimization conditions is satisfied.

In order to determine whether one of the optimization conditions is satisfied, the specific service node 100 may refer to (i) a latest-block number of a latest block among the blocks and a predetermined threshold number, or (ii) predetermined threshold time. Herein, the predetermined threshold number may correspond to (i) a cardinal number of the blocks that can be stored in the specific service node 100, or (ii) a data life cycle required by a service running on the blockchain network. The predetermined threshold time may also correspond to the data life cycle required by a service running on the blockchain network.

First, an example embodiment of determining whether one of the optimization conditions is satisfied by referring to the latest-block number of the latest block among the blocks and the predetermined threshold number is described. To this end, a case is presumed where the specific service node 100 performs or supports another device to perform a process of generating a 1-st new block corresponding to a 1-st new-block number while performing the synchronization, where the 1-st new block is a block subsequent to the latest block. Herein, the specific service node 100 may perform or support another device to perform a process of determining one of the optimization conditions as satisfied if a difference between the 1-st new-block number and a latest optimized-block number of a latest optimized block is determined as same as or greater than the predetermined threshold number where the latest optimized block is a latest one among optimized blocks to which the 1-st storage-optimization operation has been applied. That is, the specific service node may determine unoptimized blocks, comprised of from a block subsequent to the latest optimized block to a block corresponding to the 1-st new-block number minus the predetermined threshold number, as one or more target blocks as subjects to be optimized. As one example, if the predetermined threshold number is set as 100, one of the optimization conditions may be determined as satisfied if the 1-st new-block number exceeds 100.

Hereinafter, an example embodiment of determining whether one of the optimization conditions is satisfied by referring to the predetermined threshold time is described. If one or more unoptimized blocks, to which the 1-st storage-optimizing operation is not applied, are determined as present among one or more preceding blocks created before a reference time corresponding to the predetermined threshold time backward from a current point of time, the specific service node 100 may perform or support another device to perform a process of determining one of the optimization conditions as satisfied and may determine the unoptimized blocks as one or more target blocks as subjects to be optimized. As one example, if the predetermined threshold time is set as one day, one of the optimization conditions may be determined as satisfied if the unoptimized blocks created at least a day before the current point of time are determined as present.

If one of the optimization conditions is determined as satisfied as such, the specific service node 100 may apply the 1-st storage-optimizing operation to information on one or more transactions included in the target blocks.

Among the example embodiments aforementioned, a process of selection of the target blocks by referring to the latest-block number of the latest block among the blocks and the predetermined threshold number is described. The specific service node 100 may select the target blocks by referring to the 1-st new-block number of the 1-st new block and the predetermined threshold number. In more detail, if N is an integer corresponding to the 1-st new-block number and K is an integer corresponding to the predetermined threshold number, the specific service node 100 may select an (N−K)-th block as one of the target blocks where the (N−K)-th block is present at K blocks ahead of the 1-st new block. If the target blocks are selected as such, the 1-st storage-optimizing operation to be described later may be applied to the target blocks. If a 2-nd new block, i.e., an (N+1)-th block, is created while the synchronization is performed, right after the 1-st new block is created, an (N−K+1)-th block may be selected as a new target block by referring to (i) a 2-nd new-block number of the 2-nd new block and (ii) the predetermined threshold number, in a same way.

Among the example embodiments aforementioned, a process of selection of the target blocks by referring to the predetermined threshold time is described as follows. If the unoptimized blocks are determined as present among the preceding blocks created before the reference time corresponding to the predetermined threshold time backward from the current point of time, the specific service node 100 may perform or support another device to perform a process of selecting the unoptimized blocks as the target blocks.

If the target blocks are selected as such, the specific service node 100 may apply the 1-st storage-optimizing operation to the target blocks. The 1-st storage-optimizing operation may be applied to the information on the transactions included in the target blocks.

In more detail, the 1-st storage-optimizing operation may include following processes: the specific service node performs or supports another device to perform (i) a process of selecting the target blocks, which are to be optimized, among the blocks stored therein, and (ii) while maintaining header information of the target blocks, where the header information of the target blocks includes at least part of blockchain version information, function-value information on its corresponding preceding block, specific-tree function-value information, block-creation time information, nonce information, and block-mining difficulty information, a process of applying the 1-st storage-optimizing operation to the target blocks by (ii-1) deleting the information on the transactions included in the target blocks or (ii-2) deleting the information on the transactions included in the target blocks and transmitting the information on the transactions included in the target blocks to other storage, to thereby generate the optimized blocks. Herein, said other storage may be storage of another server or another device, or any other cold storage.

If the 1-st storage-optimizing operation of removing the information on the transactions included in the target blocks is performed as such, optimization of the storage may be realized since most of the space of the blocks are used by the information on the transactions, not by the header information. For example, storage reduction of about 90% in case of the Bitcoin and about 50% in case of Ethereum, among widely used blockchains, is achieved. Further, by performing the 1-st storage-optimizing operation, the header information excluding the information on the transactions is maintained, and thus the relationships among the blocks are preserved. Accordingly, the present disclosure has effects of reducing the storage space and simultaneously maintaining the reliability.

Figure 2:
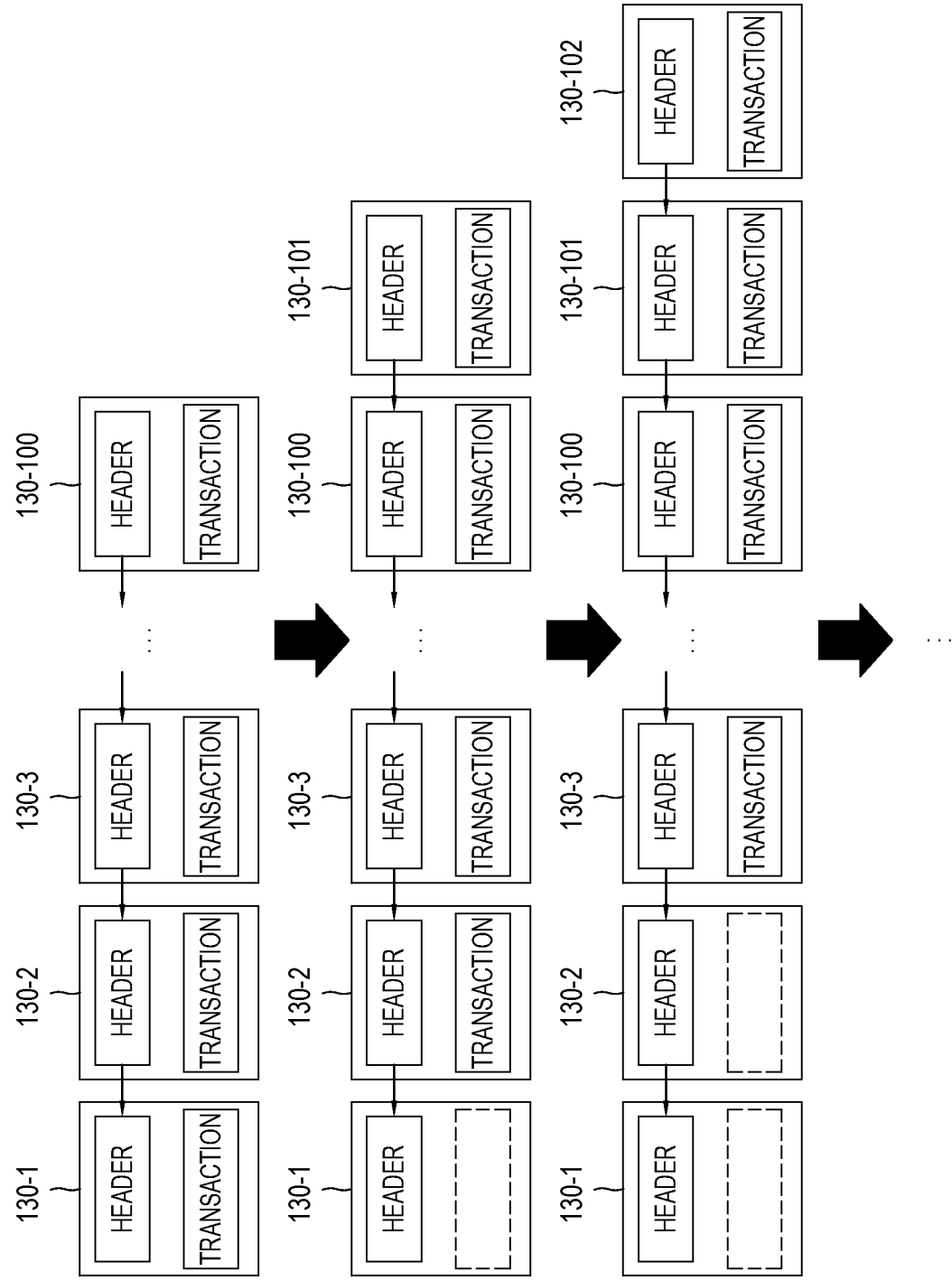
FIG. 2 is a drawing schematically illustrating processes of applying at least one 1-st storage-optimizing operation executed by the specific service node included in the blockchain network capable of automatically optimizing the storage used by each of the service nodes in accordance with one example embodiment of the present disclosure.

An example of a result of the 1-st storage-optimizing operation is described by referring to FIG. 2.

FIG. 2 is a drawing schematically illustrating processes of applying the 1-st storage-optimizing operation executed by the specific service node included in the blockchain network capable of automatically optimizing the storage used by each of the service nodes in accordance with one example embodiment of the present disclosure.

By referring to FIG. 2, a 1-st block 130-1 to a 100-th block 130-100 are shown as initially present in the specific service node 100. For convenience of explanation, the predetermined threshold number is set as 100. Herein, it is shown that, if a 101-st block 130-101 is created, the 1-st block 130-1 is selected as one of the target blocks as aforementioned, the 1-st storage-optimizing operation is applied to the 1-st block 130-1, and the information on the transactions included in the 1-st block 130-1 is deleted and/or transmitted to other storage. Then, if a 102-nd block 130-102 is created, the 2-nd block 130-2 is selected as one of the target blocks as aforementioned, the 1-st storage-optimizing operation is applied to the 2-nd block 130-2, and the information on the transactions included in the 2-nd block 130-2 is deleted and/or transmitted to other storage.

The 1-st storage-optimizing operation described so far may be seen as a way to maintain the number of the blocks stored in a node to be the predetermined threshold number by applying the aforementioned 1-st storage-optimizing operation to one block at a time. However, as another example, the target blocks may represent two or more blocks and thus the 1-st storage-optimizing operation may be applied to the multiple blocks at a time, which will be described in more detail as below.

That is, if one of the optimization conditions is determined as satisfied, the specific service node 100 may perform or support another device to perform (i) a process of selecting the target blocks among the blocks stored therein, such that a ratio of (i-1) the number of one or more unoptimized blocks, to which the 1-st storage-optimizing operation is not applied, among the blocks stored therein to (i-2) the predetermined threshold number is less than or equal to a preset value, and (ii) a process of applying the 1-st storage-optimizing operation to the target blocks.

In case of an example embodiment making use of the latest-block number of the latest block among the blocks and the predetermined threshold number, the specific service node 100 may select the target blocks among the blocks whose block numbers are greater than the latest optimized-block number of the latest optimized block.

However, in this case, to determine whether one of the optimization conditions is satisfied, the latest optimized block number of the latest optimized block, where the 1-st storage-optimizing operation is applied recently, must be referred to. That is, if a new block is created, one of the optimization conditions is determined as satisfied in case a difference between (i) a new-block number of the new block and (ii) the latest optimized block number of the latest optimized block is determined as same as or greater than the predetermined threshold number.

In case of the example embodiment of determining whether one of the optimization conditions is satisfied by referring to the predetermined threshold time, the specific service node 100 may select the target blocks among the preceding blocks created before the reference time corresponding to the predetermined threshold time backward from the current point of time, by referring only to the predetermined threshold time.

Figure 3:
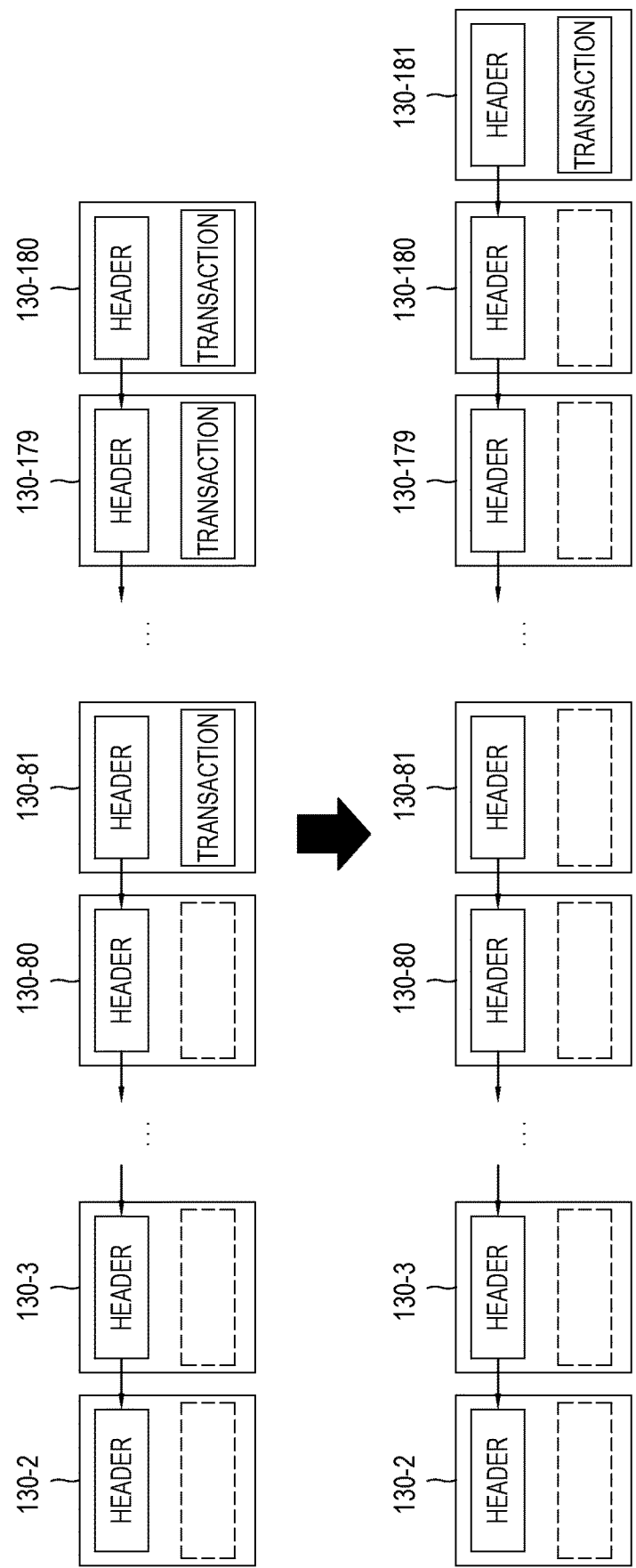
FIG. 3 is a drawing schematically illustrating another example embodiment of the 1-st storage-optimizing operation, executed by the specific service node included in the blockchain network capable of automatically optimizing the storage used by each of the service nodes in accordance with one example embodiment of the present disclosure.

An example of selecting the target blocks as such is described by referring to FIG. 3.

FIG. 3 is a drawing schematically illustrating another example embodiment of the 1-st storage-optimizing operation, executed by the specific service node included in the blockchain network capable of automatically optimizing the storage used by each of the service nodes in accordance with one example embodiment of the present disclosure.

By referring to FIG. 3, an 81-st block 130-81 to a 180-th block 130-180 are shown as initially present, and according to creation of a 181-st block 130-181, the number of the unoptimized blocks is greater than 100 and thus the 1-st storage-optimizing operation is executed. Herein, the blocks after an 80-th block, where the 1-st storage-optimizing operation has been applied to the 80-th block and/or part of its previous blocks recently, are newly selected as the target blocks, and the 1-st storage-optimizing operation is newly applied to the newly selected target blocks. Although all of the new target blocks after the 80-th block are shown as selected in the drawing, it is not a requirement, but, as aforementioned, the target blocks may be selected such that a largest block number among the block numbers of the target blocks is smaller than any of block numbers of unoptimized blocks.

To simply compare the example embodiments of FIGS. 2 and 3, if one of the optimization conditions is determined as satisfied while creation of a single block is performed, then a single target block may be selected and then deleted and/or transmitted to other storage in the example embodiment of FIG. 2, and if one of the optimization conditions is determined as satisfied while the creation of the single block is performed, then multiple target blocks may be selected at a time and then deleted and/or transmitted to other storage space at a time in the example embodiment of FIG. 3. Herein, FIG. 3 shows a process where the 1-st storage-optimizing operation is applied at a time to the 81-st block 130-81 to the 180-th block 130-180.

So far, each of the example embodiments of the specific service node 100 performing the 1-st storage-optimizing operation is described. The example embodiment of the specific service node 100 performing the 2-nd storage-optimizing operation related to a genesis block is described below.

First, as aforementioned, the specific service node 100 among the service nodes, included in the blockchain network where the specific service node is configured to optimize its own storage if one of the optimization conditions is satisfied, may perform or support another device to perform a process of generating blocks while performing the synchronization with said other service nodes included in the blockchain network, and may determine whether one of the optimization conditions is satisfied.

That is, in order to determine whether one of the optimization conditions is satisfied, the specific service node 100 may refer to (i) the latest-block number of the latest block among the blocks and the predetermined threshold number, or (ii) the predetermined threshold time.

To explain the example embodiment making use of the latest-block number of the latest block among the blocks and the predetermined threshold number, in case the specific service node 100 creates the 1-st new block corresponding to the 1-st new-block number while performing the synchronization, similarly to the aforementioned case of applying the 1-st storage-optimizing operation, the specific service node 100 may perform or support another device to perform a process of determining one of the optimization conditions as satisfied if a difference between (i) the 1-st new-block number and (ii) the latest optimized-block number of the latest optimized block is determined as same as or greater than the predetermined threshold number where the latest optimized block is a latest one among the optimized blocks to which the 2-nd storage-optimization operation has been applied.

A process of determining whether one of the optimization conditions is satisfied by referring to the predetermined threshold time is similar to that in the example embodiment making use of the 1-st storage-optimizing operation aforementioned, and is omitted.

If one of the optimization conditions is determined as satisfied as such, the specific service node 100 may apply the 2-nd storage-optimizing operation to the target blocks per se, and may generate or update the genesis block that is a replacement block, which replaces a latest one of the target blocks as subjects to which 2-nd the storage-optimizing operation is applied, the genesis block serving as a seed block capable of defining relationship between the target blocks and a first one of the untargeted blocks, where the replacement block includes information on the target blocks, where the first one of the untargeted blocks is a block subsequent to the target blocks, and where the target blocks are determined by referring to one of (i) the latest-block number of the latest block among the blocks and the predetermined threshold number, and (ii) the predetermined threshold time. To this end, the specific service node 100 may select the target blocks which are at least part of the blocks stored therein.

Among the example embodiments aforementioned, a process of selection of the target blocks by referring to the latest-block number of the latest block among the blocks and the predetermined threshold number is described. Similar to the process of the 1-st storage-optimizing operation, the specific service node 100 may select a block, with its block number equal to the 1-st new-block number of the 1-st new block subsequent to the latest block minus the predetermined threshold number, as the target block. Thereafter, the 2-nd storage-optimizing operation may be applied to the target block, and as the 2-nd new block subsequent to the 1-st new block is created, a new target block subsequent to the target block is selected and the 2-nd storage-optimizing operation may be applied thereto.

Among the example embodiments aforementioned, a process of selection of the target blocks by referring to the predetermined threshold time is similar to that of selecting the target blocks in the example embodiment making use of the 1-st storage-optimizing operation aforementioned, and are omitted. However, in this case, the selected target blocks may be deleted where the target block, whose block number is the largest among the selected target blocks, is used for updating the information on the genesis block.

If the target block is selected as such, the specific service node 100 may apply the 2-nd storage-optimizing operation to the target blocks. The 2-nd storage-optimizing operation may include a process of deleting the target blocks per se and a process of generating or updating the genesis block. Herein, the process above may occur in a different order or at the same time.

In detail, the 2-nd storage-optimizing operation may include following processes: (i) if the target blocks are selected, a process of applying the 2-nd storage-optimizing operation to the target blocks by (i-1) deleting the information on the target blocks or (i-2) deleting the information on the target blocks and transmitting the information on the target blocks to other storage, and (ii) a process of updating the information on the genesis block by referring to the information on the target blocks. The process of updating the information on the genesis block may include following a process: updating the genesis block that is the replacement block, which replaces the latest one of the target blocks as subjects to which the 2-nd storage-optimizing operation is applied, the genesis block serving as the seed block capable of defining the relationship between the target blocks and the first one of the untargeted blocks, where the replacement block includes the information on the target blocks, where the first one of the untargeted blocks is a block subsequent to the target blocks, and where the target blocks are determined by referring to one of (i) the latest-block number of the latest block among the blocks and the predetermined threshold number and (ii) the predetermined threshold time.

The 2-nd storage-optimizing operation performs a function of optimizing the storage basically by deleting the target blocks. However, simple deletion of the target blocks in the blockchain network causes relationships among the blocks in the blockchain network to break apart, which is highly discouraged since which block the data chain originates from becomes unknowable, therefore, the information on the seed block as the information on the genesis block is updated continuously in order to overcome the problem. In detail, each of the blocks includes each function value, i.e., a parent hash, of its preceding block, to thereby construct the data chain in a form of a linked list, but the simple deletion of the seed block breaks this blockchain in a form of a complete linked list, thus the information on the genesis block is updated together in order to maintain the blockchain in a form of the complete linked list.

The present example embodiment has an advantage of more significant reduction of the storage space compared to that of the 1-st storage-optimizing operation described above, since a whole block is deleted continuously.

Figure 4:
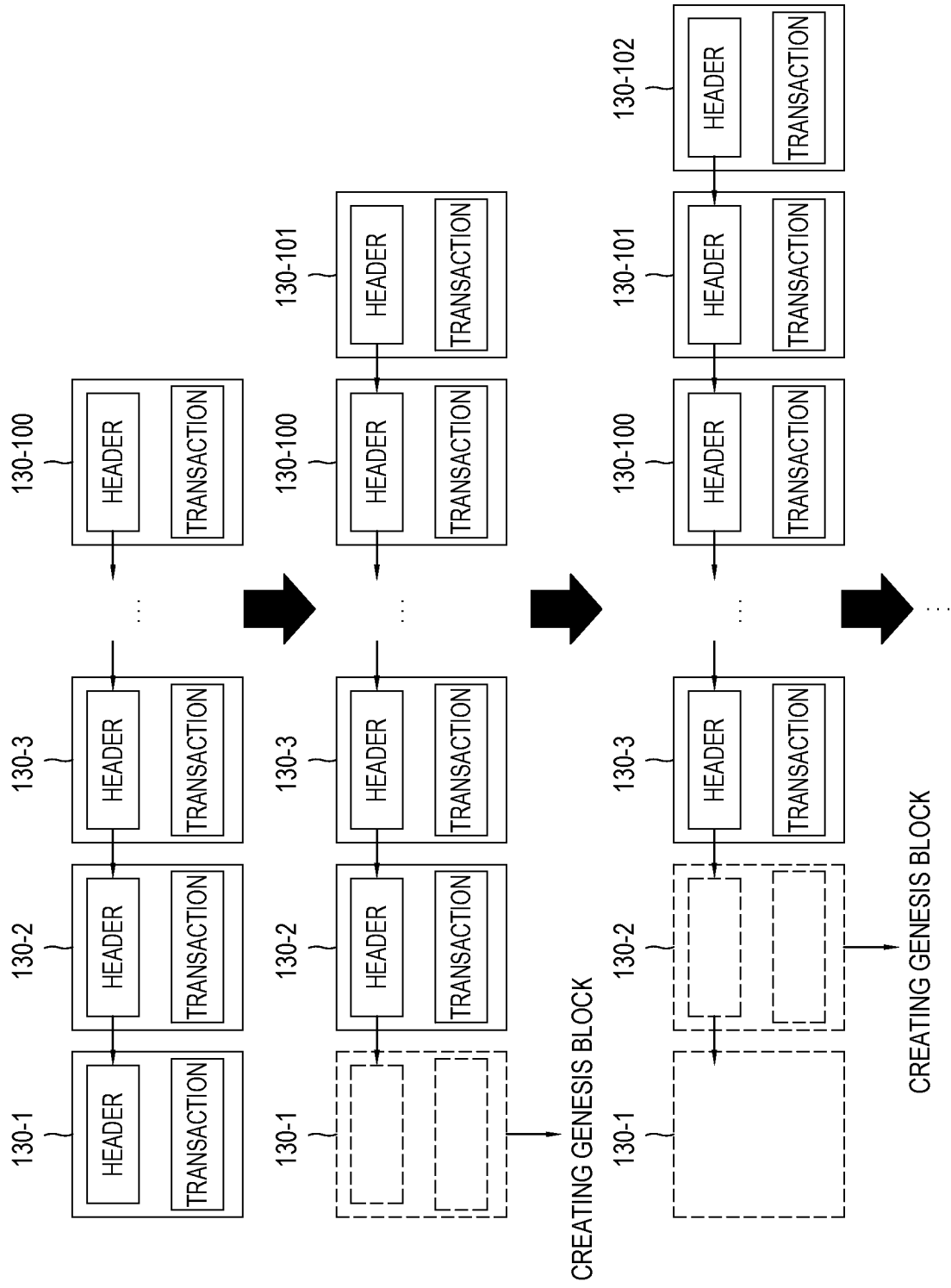
FIG. 4 is a drawing schematically illustrating at least one 2-nd storage-optimizing operation executed by the specific service node included in the blockchain network capable of automatically optimizing the storage used by each of the service nodes in accordance with one example embodiment of the present disclosure.

An example of a result of the 2-nd storage-optimizing operation as such is described by referring to FIG. 4.

FIG. 4 is a drawing schematically illustrating the 2-nd storage-optimizing operation executed by the specific service node included in the blockchain network capable of automatically optimizing the storage used by each of the service nodes in accordance with one example embodiment of the present disclosure.

By referring to FIG. 4, a 1-st block 130-1 to a 100-th block 130-100 are shown as initially present in the specific service node 100. Herein, it is shown that, if a 101-st block 130-101 is created, the 1-st block 130-1 is selected as one of the target blocks as aforementioned, the 2-nd storage-optimizing operation is applied to the 1-st block 130-1. Accordingly, the 1-st block 130-1 is deleted and/or transmitted to other storage, and the genesis block is updated by using the information on the 1-st block 130-1. Also, if a 102-nd block 130-102 is created, the 2-nd block 130-2 is selected as one of the target blocks as aforementioned, and the 2-nd storage-optimizing operation may be applied to the 2-nd block 130-2.

The 2-nd storage-optimizing operation as described above may have a problem if a new node is added to the specific service node 100. That is, in case the new node is created and being synchronized with said other service nodes, the new node will initially acquire the information on the genesis block from the specific service node 100, and will build the data chain originated from the information on the genesis block. However, during such a process, if a delay occurs due to a fault in the blockchain network or any other reason, part of the target blocks are already deleted from the specific service node 100 and thus the new node cannot build the data chain originated from the information on the genesis block.

For example, if the new node acquires information, representing that a 1-st block is designated as the seed block, from the specific service node 100, then the new node may start to build the data chain by acquiring a 2-nd block and a 3-rd block based on the 1-st block, however, the delay may cause the new node to fail to obtain the information on the 2-nd block and the 3-rd block before the 2-nd block and the 3-rd block are deleted from the specific service node 100.

Another example embodiment using a buffer in order to prevent such a problem is described as follows. That is, the specific service node 100 may perform or support another device to perform (i) a process of storing the target blocks in the buffer with a predetermined size and (ii) one of (ii-1) a process of deleting the target blocks and (ii-2) a process of deleting the target blocks from itself and/or transmitting the target blocks to other storages after a preset number of one or more new blocks are created (by using the target blocks stored in the buffer as the case may be). The buffer may be implemented in a form of a queue depending on the example embodiments such that a block, whose time spent in the buffer is a longest, is a first to be deleted, but the scope of the present disclosure is not limited thereto, and any data structure may be adopted in order to implement such a buffer.

In detail, in case the new node is added when an N-th block is selected as the target block and the information on the genesis block is updated by referring to the target block, the specific service node 100 may provide the new node with the information on the genesis block whose state is updated by referring to the information on the N-th block. Thereafter, the specific service node 100 may perform or support another device to perform a process of sequentially updating the information on the genesis block by referring to an (N+1)-th block to an (N+P)-th block, in response to continuous creation of its subsequent new blocks, where P is an integer less than or equal to the predetermined size of the buffer, and a process of storing the (N+1)-th block to the (N+P)-th block in the buffer, instead of deleting the (N+1)-th block to the (N+P)-th block immediately. And, the specific service node 100 may transmit the (N+1)-th block to the (N+P)-th block to the new node, i.e., each of the new nodes managed by each of said other service nodes included in the blockchain network, to thereby allow the new node to be synchronized based on the N-th block.

In an aforementioned description, P blocks, corresponding to the information on the genesis block, after the N-th block, that is, the (N+1)-th block to the (N+P)-th block, are described as transmitted from the buffer to the new node, i.e., each of the new nodes managed by each of said other service nodes included in the blockchain network, but in reality, the (N+1)-th block to the (N+P)-th block may be transmitted to the new node from a storage managed by the specific service node, said other service nodes or any other entities, which is not the buffer, before the 2-nd storage-optimizing operation is executed. Also, blocks after an (N+P+1)-th block may be transmitted from the buffer or another storage, that is not the buffer, to the new node according to whether the 2-nd storage-optimizing operation is executed or not. That is, the buffer is not only used to prepare for a delay right after the new node is provided with the information on the genesis block, but also used to prepare for any delays that may happen while the synchronization is performed. In detail, the buffer may be necessary to prepare for a case when the 2-nd storage-optimizing operation is executed, due to any delays at any time, before the target blocks are transmitted to each of the new nodes managed by each of said other service nodes included in the blockchain network.

Figure 5:
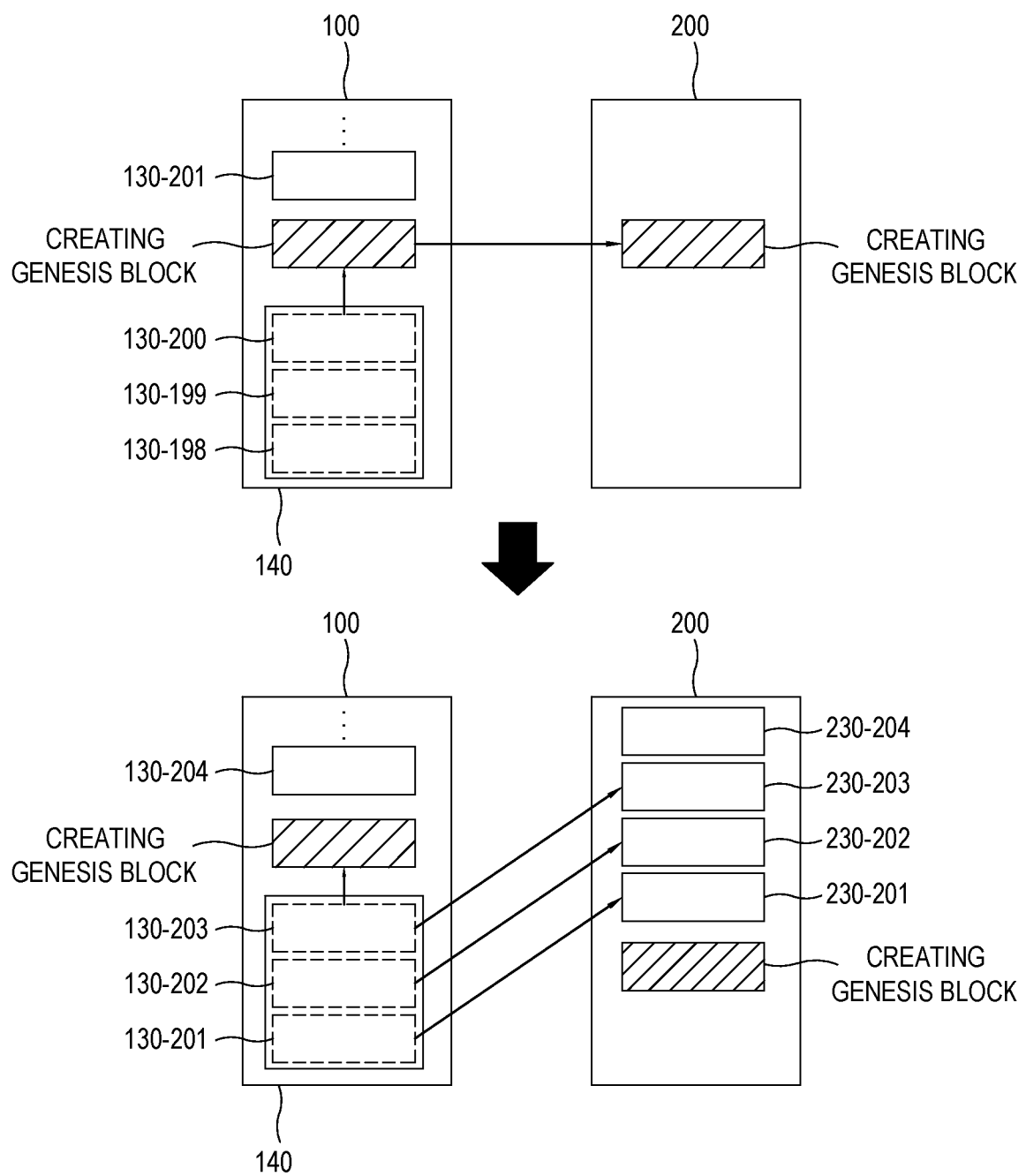
FIG. 5 is a drawing schematically illustrating one example embodiment of using a buffer in order to complement the 2-nd storage-optimizing operation executed by the specific service node included in the blockchain network capable of automatically optimizing the storage used by each of the service nodes in accordance with one example embodiment of the present disclosure.

An example of the example embodiment making use of the buffer as such is described by referring to FIG. 5.

FIG. 5 is a drawing schematically illustrating one example embodiment of using the buffer in order to complement the 2-nd storage-optimizing operation executed by the specific service node included in the blockchain network capable of automatically optimizing the storage used by each of the service nodes in accordance with one example embodiment of the present disclosure.

By referring to FIG. 5, (i) the 2-nd storage-optimizing operation is applied to a 200-th block 130-200, (ii) the information on the genesis block is updated based thereon, (iii) the 200-th block 130-200 is stored in the buffer, and (iv) the new node 130-201 is added. Each of said other nodes such as a node 200 may acquire the genesis block from the specific service node 100 and may designate the genesis block as its seed block, and then, may acquire a 201-st block 130-201 to a 203-rd block 130-203 and blocks thereafter from the specific service node 100, and may build each of the data chains comprised of the 201-st block 130-201 to the 203-rd block 130-203 originated from the genesis block.

Herein, even if the 2-nd storage-optimizing operation is applied to the 201-st block 130-201 to the 203-rd block 130-203 before the 201-st block 130-201 to the 203-rd block 130-203 are transmitted to each of said other nodes such as the node 200 due to some reasons, since the 201-st block 130-201 to the 203-rd block 130-203 remain in the buffer, the 201-st block 130-201 to the 203-rd block 130-203 may be transmitted to each of said other nodes such as the node 200 as can be seen in FIG. 5, and may be designated as a 2-nd block 230-201 to a 4-th block 230-203 of the node 200. Without the buffer, since the 201-st block 130-201 to the 203-rd block 130-203 have already been deleted, the node 200 cannot complete the data chain based on the genesis block.

Still another example embodiment for further complementing the 2-nd storage-optimizing operation is described as follows.

The 2-nd storage-optimizing operation as above allows the relationship among the data including the information on the seed block to be maintained by updating the information on the genesis block, however, a problem of the reliability arises since the blocks are deleted. Because forgery, etc. of the information on the genesis block by an ill-willed hacker cannot be easily detected. To complement this, a case is presumed where fingerprint function-value information on a block is added to header information of the block when the specific service node 100 creates the block.

In detail, whenever a block is created in the specific service node 100 while the synchronization with said other service nodes is performed, the specific service node 100 may allow the fingerprint function-value information on the block to be incorporated into the header information of the block. Herein, the fingerprint function-value information on the block may be created by referring to (i) block function-value information on the block and (ii) fingerprint function-value information on its corresponding at least one of preceding blocks, where the fingerprint function-value information on said its corresponding at least one of the preceding blocks was created by referring to the block function-value information on at least part of the preceding blocks.

As one example, if the specific service node 100 creates an N-th block, fingerprint function-value information on the N-th block to be included in its header information may be generated by an equation as below.

$$F_N = \text{func}_s(F_{N-1} + H_N) \times s_N$$

In the equation above, $F_N$ may represent the fingerprint function-value information on the N-th block, $F_{N-1}$ may represent fingerprint function-value information on an (N−1)-th block, and $H_N$ may represent block function-value information on the N-th block. Also, $s_N$ may represent a salt value corresponding to the fingerprint function-value information on the N-th block. Also, the specific function $\text{func}_s$ may be a predetermined hash function which (i) accepts the fingerprint function-value information on the (N−1)-th block and the block function-value information on the N-th block as its input and (ii) outputs a function value, and may also be a previously known function such as SHA-256, MD5, etc, but the scope of the present disclosure is not limited thereto. However, fingerprint function-value information on a 1-st block may be created by referring to block function-value information on the 1-st block, as an exception. As one example, the fingerprint function-value information on the 1-st block may be same as the block function-value information on the 1-st block.

Herein, if a block is the N-th block, then the fingerprint function-value information on said its corresponding at least one of the preceding blocks may correspond to $F_{N-1}$ in the above equation. This may be acquired from a result generated by the specific service node 100 while creating the (N−1)-th block. That is, basically, by continuously adding the block function-value information of a current block to the fingerprint function-value information on its corresponding preceding block, each piece of the fingerprint function-value information may be generated.

Figure 6:
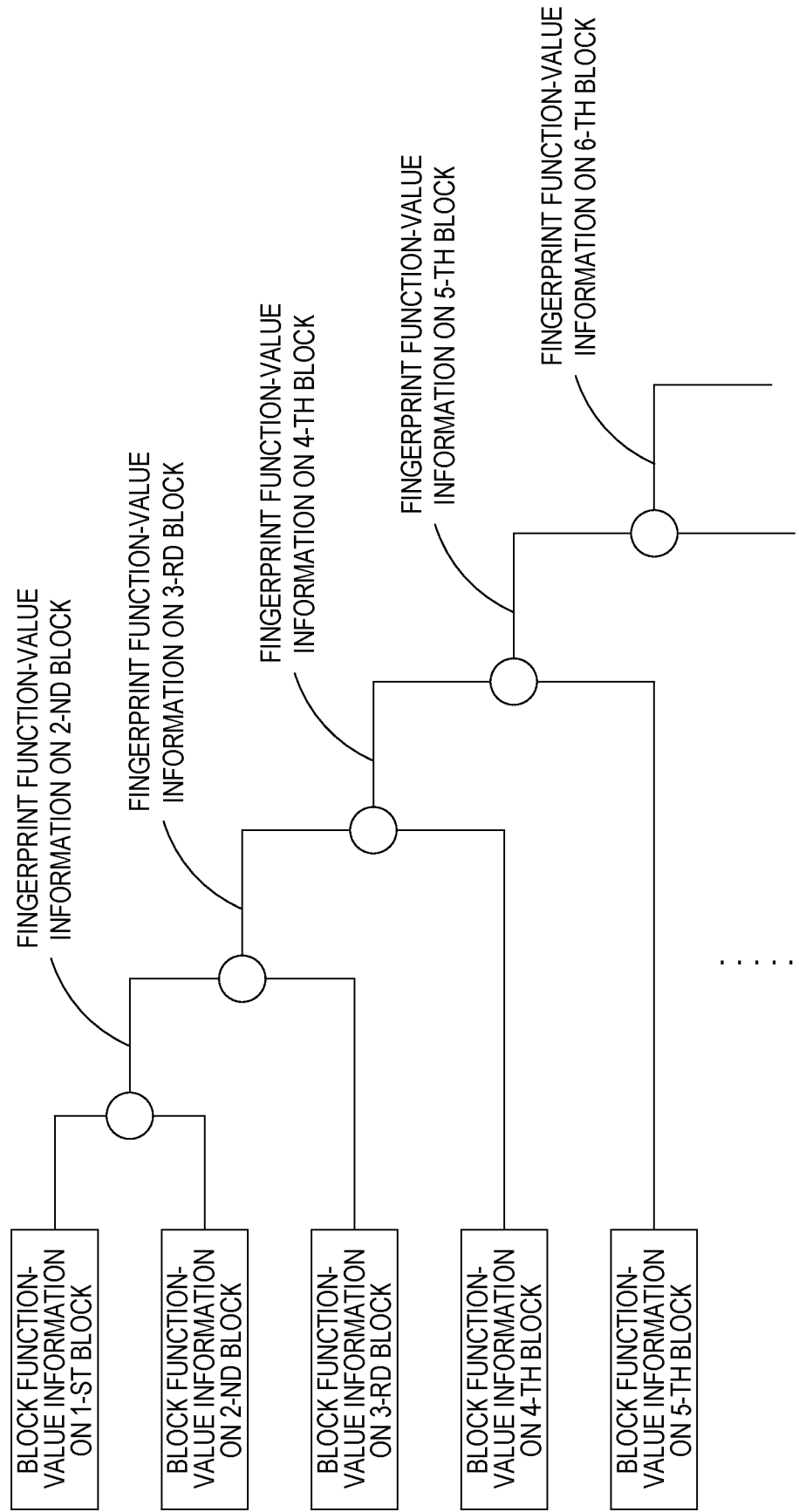
FIG. 6 is a drawing schematically illustrating a process of generating fingerprint function-value information on blocks in order to complement the 2-nd storage-optimizing operation executed by the specific service node included in the blockchain network capable of automatically optimizing the storage used by each of the service nodes in accordance with one example embodiment of the present disclosure.

An example of generating the fingerprint function-value information is described by referring to FIG. 6.

FIG. 6 is a drawing schematically illustrating a process of generating the fingerprint function-value information on the blocks in order to complement the 2-nd storage-optimizing operation executed by the specific service node included in the blockchain network capable of automatically optimizing the storage used by each of the service nodes in accordance with one example embodiment of the present disclosure.

By referring to FIG. 6, new fingerprint function-value information may be created by using previous fingerprint function-value information as in the equation above. For example, the fingerprint function-value information on a 2-nd block may be generated by applying a specific operation, i.e., a hash operation, to the block function-value information on the 1-st block and the block function-value information on the 2-nd block, and the fingerprint function-value information on a 3-rd block may be generated by applying the specific operation to the fingerprint function-value information on the 2-nd block and the block function-value information on the 3-rd block. The fingerprint function-value information may be generated as shown in FIG. 6 according to the equation above.

Meanwhile, when each of the blocks is created as such, its corresponding fingerprint function-value information is included therein, and, if the specific block is selected as the target block, the specific service node 100 may further refer to the fingerprint function-value information on the specific block when the information on the genesis block is updated. In detail, the information on the genesis block further includes the fingerprint function-value information on the specific block, in addition to the block number and the block function-value information to be used for representing the genesis block.

If the fingerprint function-value information is continuously included in the information on the genesis block, then each of the service nodes, including the specific service node 100, in the blockchain network may provide an administrator with the fingerprint function-value information included in the information on the genesis block via an administrating device. Herein, the administrator may compare respective pieces of the fingerprint function-value information, to verify as to whether each piece of data included in each of the service nodes originates from a same data chain. In detail, if each of corresponding blocks included in each of the service nodes is identical to one another among the service nodes, and if each piece of corresponding information on the transactions included in each of the service nodes is identical to one another among the service nodes, then the respective pieces of the fingerprint function-value information of the service nodes will be identical. In case the blocks are not identical or pieces of the information on the transactions are not identical to one another, the block function-value information may be added to the fingerprint function-value information of the blocks up to a specific block, i.e., a block right before an error occurs, and its result is compared with other fingerprint function-value information corresponding to the specific block in said other service nodes, thus the data included in each of the service nodes may be verified up to the specific block. The example embodiment as such prevents the forgery of the information on the genesis block, and the reliability is guaranteed.

In the above example embodiments, the 2-nd storage-optimizing operation is shown as applied to a block at a time, however, similar to the case of the 1-st storage-optimizing operation, the 2-nd storage-optimizing operation may be applied to the multiple blocks at a time. A detailed implementation example is omitted since it is similar to the example of the 1-st storage-optimizing operation.

The present disclosure has an effect of providing the blockchain network capable of automatically optimizing the storage used by each of the service nodes, to thereby allow each of the service nodes to delete the data whose data life cycle is expired on a service provided on the blockchain network.

The present disclosure has another effect of providing a method for applying the storage-optimizing operation to the information on the transactions included in the target blocks or to the target blocks per se, to thereby allow a user to choose the method for the storage-optimizing operation for his/her use.

The present disclosure has still another effect of providing a method for linking fingerprint function-value information to be used for establishing the relationship with previous blocks, as well as the method for applying the storage-optimizing operation to the target blocks per se, to thereby optimize the storage and guarantee the reliability of the data.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a blockchain network capable of optimizing storages used by one or more service nodes in the blockchain network, comprising steps of:
    (a) a specific service node among the service nodes, included in the blockchain network wherein the specific service node is configured to optimize a storage of the specific service node if one of one or more optimization conditions is satisfied, performing or supporting another device to perform a process of generating blocks while performing synchronization with one or more other service nodes included in the blockchain network; and
    (b) the specific service node performing or supporting another device to perform (b1) a process of determining whether one of the optimization conditions is satisfied, by referring to one of (i) (i-1) a latest-block number of a latest block among the blocks and (i-2) a predetermined threshold number, and (ii) a predetermined threshold time and (b2) if one of the optimization conditions is determined as satisfied, a process of applying at least one storage-optimizing operation to information on one or more transactions included in one or more target blocks which are at least part of the blocks having not been optimized, wherein the target blocks are determined by referring to one of said (i) and said (ii),
    wherein, at the step of (a), the specific service node performs or supports another device to perform a process of generating a 1-st new block corresponding to a 1-st new-block number while performing the synchronization wherein the 1-st new block is a block subsequent to the latest block, and
    wherein, at the step of (b), the specific service node performs or supports another device to perform (i) a process of determining one of the optimization conditions as satisfied if a difference between the 1-st new-block number and a latest optimized-block number of a latest optimized block is determined as same as or greater than the predetermined threshold number wherein the latest optimized block is a latest one among optimized blocks to which the storage-optimization operation has been applied, and (ii) if one of the optimization conditions is determined as satisfied, a process of selecting the target blocks, which are to be optimized, among the blocks stored therein, by referring to the 1-st new-block number and the predetermined threshold number, and then, and (iii) while maintaining header information of the target blocks, wherein the header information of the target blocks includes at least part of blockchain version information, function-value information on its corresponding preceding block, specific-tree function-value information, block-creation time information, nonce information, and block-mining difficulty information, a process of applying the storage-optimizing operation to the target blocks by (iii-1) deleting the information on the transactions included in the target blocks or (iii-2) deleting the information on the transactions included in the target blocks and transmitting the information on the transactions included in the target blocks to other storage, to thereby generate the optimized blocks.

2. The method of claim 1, wherein, after the step of (b), if a 2-nd new block is created while the synchronization with said other service nodes is performed, wherein the 2-nd new block is a block subsequent to the 1-st new block, the specific service node performs or supports another device to perform (i) a process of selecting at least one new target block, which is to be optimized, by referring to a 2-nd new-block number of the 2-nd new block and the predetermined threshold number and (ii) a process of applying the storage-optimizing operation to the new target block.

3. The method of claim 2, wherein, if an N-th block is created as the 1-st new block while the synchronization with said other service nodes is performed, wherein N is an integer corresponding to the 1-st new-block number, the specific service node performs or supports another device to perform (i) a process of selecting an (N−K)-th block as one of the target blocks wherein K is an integer corresponding to the predetermined threshold number, (ii) a process of applying the storage-optimizing operation to the (N−K)-th block, (iii) a process of generating an (N+1)-th block as the 2-nd new block while performing the synchronization with said other service nodes, and (iv) a process of selecting an (N−K+1)-th block as the new target block and applying the storage-optimizing operation to the new target block.

4. A method for providing a blockchain network capable of optimizing storages used by one or more service nodes in the blockchain network, comprising steps of:
    (a) a specific service node among the service nodes, included in the blockchain network wherein the specific service node is configured to optimize a storage of the specific service node if one of one or more optimization conditions is satisfied, performing or supporting another device to perform a process of generating blocks while performing synchronization with one or more other service nodes included in the blockchain network; and (b) the specific service node performing or supporting another device to perform (b1) a process of determining whether one of the optimization conditions is satisfied, by referring to one of (i) (i-1) a latest-block number of a latest block among the blocks and (i-2) a predetermined threshold number, and (ii) a predetermined threshold time and (b2) if one of the optimization conditions is determined as satisfied, a process of applying at least one storage-optimizing operation to information on one or more transactions included in one or more target blocks which are at least part of the blocks having not been optimized, wherein the target blocks are determined by referring to one of said (i) and said (ii), wherein, at the step of (b), if one or more unoptimized blocks, to which the storage-optimizing operation is not applied, are determined as present among one or more preceding blocks created before a reference time corresponding to the predetermined threshold time backward from a current point of time, the specific service node performs or supports another device to perform a process of determining one of the optimization conditions as satisfied and a process of selecting the unoptimized blocks as the target blocks.

5. A method for providing a blockchain network capable of optimizing storages used by one or more service nodes in the blockchain network, comprising steps of:

(a) a specific service node among the service nodes, included in the blockchain network wherein the specific service node is configured to optimize a storage of the specific service node if one of one or more optimization conditions is satisfied, performing or supporting another device to perform a process of generating blocks while performing synchronization with one or more other service nodes included in the blockchain network; and (b) the specific service node performing or supporting another device to perform (b1) a process of determining whether one of the optimization conditions is satisfied, by referring to one of (i) (i-1) a latest-block number of a latest block among the blocks and (i-2) a predetermined threshold number, and (ii) a predetermined threshold time and (b2) if one of the optimization conditions is determined as satisfied, a process of applying at least one storage-optimizing operation to information on one or more transactions included in one or more target blocks which are at least part of the blocks having not been optimized, wherein the target blocks are determined by referring to one of said (i) and said (ii), wherein, at the step of (b), if one of the optimization conditions is determined as satisfied, the specific service node performs or supports another device to perform (i) a process of selecting the target blocks among the blocks stored therein, such that a ratio of (i-1) the number of one or more unoptimized blocks, to which the storage-optimizing operation is not applied, among the blocks stored therein to (i-2) the predetermined threshold number is less than or equal to a preset value, and (ii) a process of applying the storage-optimizing operation to the target blocks.

6. A method for providing a blockchain network capable of optimizing storages used by one or more service nodes in the blockchain network, comprising steps of:

(a) a specific service node among the service nodes, included in the blockchain network wherein the specific service node is configured to optimize a storage of the specific service node if one of one or more optimization conditions is satisfied, performing or supporting another device to perform a process of generating blocks while performing synchronization with one or more other service nodes included in the blockchain network; and (b) the specific service node performing or supporting another device to perform (b1) a process of determining whether one of the optimization conditions is satisfied, by referring to one of (i) (i-1) a latest-block number of a latest block among the blocks and (i-2) a predetermined threshold number, and (ii) a predetermined threshold time and (b2) if one of the optimization conditions is determined as satisfied, a process of applying at least one storage-optimizing operation to one or more target blocks and a process of generating or updating a genesis block that is a replacement block, which replaces a latest one of the target blocks as subjects to which the storage-optimizing operation is applied, the genesis block serving as a seed block capable of defining relationship between the target blocks and a first one of untargeted blocks, wherein the replacement block includes information on the target blocks, wherein the first one of the untargeted blocks is a block subsequent to the target blocks, and wherein the target blocks are determined by referring to one of said (i) and said (ii), wherein, at the step of (a), the specific service node performs or supports another device to perform a process of generating a 1-st new block corresponding to a 1-st new-block number while performing the synchronization wherein the 1-st new block is a block subsequent to the latest block, and wherein, at the step of (b), the specific service node performs or supports another device to perform (i) a process of determining one of the optimization conditions as satisfied if a difference between the 1-st new-block number and a latest optimized-block number of a latest optimized block is determined as same as or greater than the predetermined threshold number wherein the latest optimized block is a latest one among optimized blocks to which the storage-optimization operation has been applied, (ii) if one of the optimization conditions is determined as satisfied, a process of selecting the target blocks, which are to be optimized, among the blocks stored therein, by referring to the 1-st new-block number and the predetermined threshold number, (iii) a process of applying the storage-optimizing operation to the target blocks by (iii-1) deleting the information on the target blocks or (iii-2) deleting the information on the target blocks and transmitting the information on the target blocks to other storage, and (iv) a process of updating the information on the genesis block by referring to the information on the target blocks.

7. The method of claim 6, wherein the specific service node performs or supports another device to perform (i) a process of updating the information on the genesis block, (ii) a process of storing the target blocks in a buffer with a predetermined size while a preset number of one or more new blocks are created and (iii) one of (iii-1) a process of deleting the target blocks and (iii-2) a process of deleting the target blocks from itself and transmitting the target blocks to other storage.

8. The method of claim 7, wherein, if a 2-nd new block is created while the synchronization with said other service nodes is performed wherein the 2-nd new block is a block subsequent to the 1-st new block, the specific service node performs or supports another device to perform (i) a process of selecting at least one new target block, which is to be optimized, by referring to a 2-nd new-block number of the 2-nd new block and the predetermined threshold number and (ii) a process of applying the storage-optimizing operation to the new target block, and then storing the new target block in the buffer.

9. The method of claim 7, wherein, if a new node is added to the blockchain network, the specific service node performs or supports another device to perform (i) a process of providing the new node with the information on the genesis block whose state is updated by referring to information on an N-th block, (ii) a process of providing the new node with information on an (N+1)-th block to an (N+P)-th block stored in the buffer, while performing synchronization with the new node wherein P is an integer less than or equal to the predetermined size of the buffer, to thereby allow the new node to be synchronized based on the information on the genesis block whose state is updated by referring to the information on the N-th block, despite the storage-optimizing operation.

10. A method for providing a blockchain network capable of optimizing storages used by one or more service nodes in the blockchain network, comprising steps of:

(a) a specific service node among the service nodes, included in the blockchain network wherein the specific service node is configured to optimize a storage of the specific service node if one of one or more optimization conditions is satisfied, performing or supporting another device to perform a process of generating blocks while performing synchronization with one or more other service nodes included in the blockchain network; and (b) the specific service node performing or supporting another device to perform (b1) a process of determining whether one of the optimization conditions is satisfied, by referring to one of (i) (i-1) a latest-block number of a latest block among the blocks and (i-2) a predetermined threshold number, and (ii) a predetermined threshold time and (b2) if one of the optimization conditions is determined as satisfied, a process of applying at least one storage-optimizing operation to one or more target blocks and a process of generating or updating a genesis block that is a replacement block, which replaces a latest one of the target blocks as subjects to which the storage-optimizing operation is applied, the genesis block serving as a seed block capable of defining relationship between the target blocks and a first one of untargeted blocks, wherein the replacement block includes information on the target blocks, wherein the first one of the untargeted blocks is a block subsequent to the target blocks, and wherein the target blocks are determined by referring to one of said (i) and said (ii), wherein, at the step of (a), if a specific block is created while the synchronization with said other service nodes is performed, the specific service node allows fingerprint function-value information on the specific block to be incorporated into header information of the specific block, and wherein the fingerprint function-value information on the specific block is created by referring to (i) block function-value information on the specific block and (ii) fingerprint function-value information on its corresponding at least one of preceding blocks, wherein the fingerprint function-value information on said its corresponding at least one of the preceding blocks is created by referring to the block function-value information on at least part of the preceding blocks.

11. The method of claim 10, wherein, while an N-th block is created while the synchronization with said other service nodes is performed, wherein N is an integer, the specific service node allows fingerprint function-value information on the N-th block to be incorporated into header information of the N-th block, and $$F_N = \text{func}_s(F_{N-1} + H_N) \times s_N$$

wherein the fingerprint function-value information on the N-th block is created according to the equation above, and in the equation, $F_N$ represents the fingerprint function-value information on the N-th block, $F_{N-1}$ represents fingerprint function-value information on an (N−1)-th block, $H_N$ represents block function-value information on the N-th block, $s_N$ represents a salt value corresponding to the fingerprint function-value information on the N-th block, and the specific function $\text{func}_s$ represents a predetermined function which (i) accepts the fingerprint function-value information on the (N−1)-th block and the block function-value information on the N-th block as its input and (ii) outputs a function value, and wherein fingerprint function-value information on a 1-st block is created by referring to block function-value information on the 1-st block.

12. The method of claim 10, wherein, at the step of (b), if the specific block is selected as one of the target blocks, the specific service node performs or supports another device to perform a process of updating the information on the genesis block via the storage-optimizing operation by further referring to information on the specific block including the fingerprint function-value information on the specific block.

13. The method of claim 10, wherein the specific service node provides fingerprint function-value information on the genesis block, included in the information on the genesis block, to each of said other service nodes, to thereby support each of said other service nodes to verify as to whether each piece of data included in each of the service nodes originates from a same data chain as that of the specific service node.

14. A method for providing a blockchain network capable of optimizing storages used by one or more service nodes in the blockchain network, comprising steps of:

(a) a specific service node among the service nodes, included in the blockchain network wherein the specific service node is configured to optimize a storage of the specific service node if one of one or more optimization conditions is satisfied, performing or supporting another device to perform a process of generating blocks while performing synchronization with one or more other service nodes included in the blockchain network; and (b) the specific service node performing or supporting another device to perform (b1) a process of determining whether one of the optimization conditions is satisfied, by referring to one of (i) (i-1) a latest-block number of a latest block among the blocks and (i-2) a predetermined threshold number, and (ii) a predetermined threshold time and (b2) if one of the optimization conditions is determined as satisfied, a process of applying at least one storage-optimizing operation to one or more target blocks and a process of generating or updating a genesis block that is a replacement block, which replaces a latest one of the target blocks as subjects to which the storage-optimizing operation is applied, the genesis block serving as a seed block capable of defining relationship between the target blocks and a first one of untargeted blocks, wherein the replacement block includes information on the target blocks, wherein the first one of the untargeted blocks is a block subsequent to the target blocks, and wherein the target blocks are determined by referring to one of said (i) and said (ii), wherein, at the step of (b), the specific service node performs or supports another device to perform (i) a process of selecting the target blocks, which are to be optimized, whose block numbers are continuous, such that a ratio of (i-1) the number of one or more unoptimized blocks, to which the storage-optimizing operation is not applied, among the blocks stored therein to (i-2) the predetermined threshold number is less than or equal to a preset value, (ii) a process of executing the storage-optimizing operation by (ii-1) deleting the target blocks, and (ii-2) selecting a latest target block whose block number is largest among the target blocks, and (iii) a process of updating the information on the genesis block by referring to information on the target blocks.

15. A specific service node among one or more service nodes, included in a blockchain network wherein the specific service node is configured to optimize a storage of the specific service node if one of one or more optimization conditions is satisfied, for providing the blockchain network capable of optimizing storages used by the service nodes in the blockchain network, comprising:

at least one memory that stores instructions; and
at least one processor configured to execute the instructions to perform or support another device to perform: (I) a process of generating blocks while performing synchronization with one or more other service nodes included in the blockchain network, and (II) (II-1) a process of determining whether one of the optimization conditions is satisfied, by referring to one of (i) (i-1) a latest-block number of a latest block among the blocks and (i-2) a predetermined threshold number, and (ii) a predetermined threshold time and (II-2) if one of the optimization conditions is determined as satisfied, a process of applying at least one storage-optimizing operation to information on one or more transactions included in one or more target blocks which are at least part of the blocks having not been optimized, wherein the target blocks are determined by referring to one of said (i) and said (ii), wherein, at the process of (I), the processor performs or supports another device to perform a process of generating a 1-st new block corresponding to a 1-st new-block number while performing the synchronization wherein the 1-st new block is a block subsequent to the latest block, and wherein, at the process of (II), the processor performs or supports another device to perform (i) a process of determining one of the optimization conditions as satisfied if a difference between the 1-st new-block number and a latest optimized-block number of a latest optimized block is determined as same as or greater than the predetermined threshold number wherein the latest optimized block is a latest one among optimized blocks to which the storage-optimization operation has been applied, and (ii) if one of the optimization conditions is determined as satisfied, a process of selecting the target blocks, which are to be optimized, among the blocks stored therein, by referring to the 1-st new-block number and the predetermined threshold number, and then, and (iii) while maintaining header information of the target blocks, wherein the header information of the target blocks includes at least part of blockchain version information, function-value information on its corresponding preceding block, specific-tree function-value information, block-creation time information, nonce information, and block-mining difficulty information, a process of applying the storage-optimizing operation to the target blocks by (iii-1) deleting the information on the transactions included in the target blocks or (iii-2) deleting the information on the transactions included in the target blocks and transmitting the information on the transactions included in the target blocks to other storage, to thereby generate the optimized blocks.

16. The specific service node of claim 15, wherein, after the process of (II), if a 2-nd new block is created while the synchronization with said other service nodes is performed, wherein the 2-nd new block is a block subsequent to the 1-st new block, the processor performs or supports another device to perform (i) a process of selecting at least one new target block, which is to be optimized, by referring to a 2-nd new-block number of the 2-nd new block and the predetermined threshold number and (ii) a process of applying the storage-optimizing operation to the new target block.

17. The specific service node of claim 16, wherein, if an N-th block is created as the 1-st new block while the synchronization with said other service nodes is performed, wherein N is an integer corresponding to the 1-st new-block number, the processor performs or supports another device to perform (i) a process of selecting an (N−K)-th block as one of the target blocks wherein K is an integer corresponding to the predetermined threshold number, (ii) a process of applying the storage-optimizing operation to the (N−K)-th block, (iii) a process of generating an (N+1)-th block as the 2-nd new block while performing the synchronization with said other service nodes, and (iv) a process of selecting an (N−K+1)-th block as the new target block and applying the storage-optimizing operation to the new target block.

18. A specific service node among one or more service nodes, included in a blockchain network wherein the specific service node is configured to optimize a storage of the specific service node if one of one or more optimization conditions is satisfied, for providing the blockchain network capable of optimizing storages used by the service nodes in the blockchain network, comprising:

at least one memory that stores instructions; and
at least one processor configured to execute the instructions to perform or support another device to perform: (I) a process of generating blocks while performing synchronization with one or more other service nodes included in the blockchain network, and (II) (II-1) a process of determining whether one of the optimization conditions is satisfied, by referring to one of (i) (i-1) a latest-block number of a latest block among the blocks and (i-2) a predetermined threshold number, and (ii) a predetermined threshold time and (II-2) if one of the optimization conditions is determined as satisfied, a process of applying at least one storage-optimizing operation to information on one or more transactions included in one or more target blocks which are at least part of the blocks having not been optimized, wherein the target blocks are determined by referring to one of said (i) and said (ii), wherein, at the process of (II), if one or more unoptimized blocks, to which the storage-optimizing operation is not applied, are determined as present among one or more preceding blocks created before a reference time corresponding to the predetermined threshold time backward from a current point of time, the processor performs or supports another device to perform a process of determining one of the optimization conditions as satisfied and a process of selecting the unoptimized blocks as the target blocks.

19. A specific service node among one or more service nodes, included in a blockchain network wherein the specific service node is configured to optimize a storage of the specific service node if one of one or more optimization conditions is satisfied, for providing the blockchain network capable of optimizing storages used by the service nodes in the blockchain network, comprising:

at least one memory that stores instructions; and
at least one processor configured to execute the instructions to perform or support another device to perform: (I) a process of generating blocks while performing synchronization with one or more other service nodes included in the blockchain network, and (II) (II-1) a process of determining whether one of the optimization conditions is satisfied, by referring to one of (i) (i-1) a latest-block number of a latest block among the blocks and (i-2) a predetermined threshold number, and (ii) a predetermined threshold time and (II-2) if one of the optimization conditions is determined as satisfied, a process of applying at least one storage-optimizing operation to information on one or more transactions included in one or more target blocks which are at least part of the blocks having not been optimized, wherein the target blocks are determined by referring to one of said (i) and said (ii), wherein, at the process of (II), if one of the optimization conditions is determined as satisfied, the processor performs or supports another device to perform (i) a process of selecting the target blocks among the blocks stored therein, such that a ratio of (i-1) the number of one or more unoptimized blocks, to which the storage-optimizing operation is not applied, among the blocks stored therein to (i-2) the predetermined threshold number is less than or equal to a preset value, and (ii) a process of applying the storage-optimizing operation to the target blocks.

20. A specific service node among one or more service nodes, included in a blockchain network wherein the specific service node is configured to optimize a storage of the specific service node if one of one or more optimization conditions is satisfied, for providing the blockchain network capable of optimizing storages used by the service nodes in the blockchain network, comprising:

at least one memory that stores instructions; and
at least one processor configured to execute the instructions to perform or support another device to perform: (I) a process of generating blocks while performing synchronization with one or more other service nodes included in the blockchain network, and (II) (II-1) a process of determining whether one of the optimization conditions is satisfied, by referring to one of (i) (i-1) a latest-block number of a latest block among the blocks and (i-2) a predetermined threshold number, and (ii) a predetermined threshold time and (II-2) if one of the optimization conditions is determined as satisfied, a process of applying at least one storage-optimizing operation to one or more target blocks and a process of generating or updating a genesis block that is a replacement block, which replaces a latest one of the target blocks as subjects to which the storage-optimizing operation is applied, the genesis block serving as a seed block capable of defining relationship between the target blocks and a first one of untargeted blocks, wherein the replacement block includes information on the target blocks, wherein the first one of the untargeted blocks is a block subsequent to the target blocks, and wherein the target blocks are determined by referring to one of said (i) and said (ii), wherein, at the process of (I), the processor performs or supports another device to perform a process of generating a 1-st new block corresponding to a 1-st new-block number while performing the synchronization wherein the 1-st new block is a block subsequent to the latest block, and wherein, at the process of (II), the processor performs or supports another device to perform (i) a process of determining one of the optimization conditions as satisfied if a difference between the 1-st new-block number and a latest optimized-block number of a latest optimized block is determined as same as or greater than the predetermined threshold number wherein the latest optimized block is a latest one among optimized blocks to which the storage-optimization operation has been applied, (ii) if one of the optimization conditions is determined as satisfied, a process of selecting the target blocks, which are to be optimized, among the blocks stored therein, by referring to the 1-st new-block number and the predetermined threshold number, (iii) a process of applying the storage-optimizing operation to the target blocks by (iii-1) deleting the information on the target blocks or (iii-2) deleting the information on the target blocks and transmitting the information on the target blocks to other storage, and (iv) a process of updating the information on the genesis block by referring the to information on the target blocks.

21. The specific service node of claim 20, wherein the processor performs or supports another device to perform (i) a process of updating the information on the genesis block, (ii) a process of storing the target blocks in a buffer with a predetermined size while a preset number of one or more new blocks are created and (iii) one of (iii-1) a process of deleting the target blocks and (iii-2) a process of deleting the target blocks from itself and transmitting the target blocks to other storage.

22. The specific service node of claim 21, wherein, if a 2-nd new block is created while the synchronization with said other service nodes is performed wherein the 2-nd new block is a block subsequent to the 1-st new block, the processor performs or supports another device to perform (i) a process of selecting at least one new target block, which is to be optimized, by referring to a 2-nd new-block number of the 2-nd new block and the predetermined threshold number and (ii) a process of applying the storage-optimizing operation to the new target block, and then storing the new target block in the buffer.

23. The specific service node of claim 21, wherein, if a new node is added to the blockchain network, the processor performs or supports another device to perform (i) a process of providing the new node with the information on the genesis block whose state is updated by referring to information on an N-th block, (ii) a process of providing the new node with information on an (N+1)-th block to an (N+P)-th block stored in the buffer, while performing synchronization with the new node wherein P is an integer less than or equal to the predetermined size of the buffer, to thereby allow the new node to be synchronized based on the information on the genesis block whose state is updated by referring to the information on the N-th block, despite the storage-optimizing operation.

24. A specific service node among one or more service nodes, included in a blockchain network wherein the specific service node is configured to optimize a storage of the specific service node if one of one or more optimization conditions is satisfied, for providing the blockchain network capable of optimizing storages used by the service nodes in the blockchain network, comprising:
at least one memory that stores instructions; and
at least one processor configured to execute the instructions to perform or support another device to perform: (I) a process of generating blocks while performing synchronization with one or more other service nodes included in the blockchain network, and (II) (II-1) a process of determining whether one of the optimization conditions is satisfied, by referring to one of (i) (i-1) a latest-block number of a latest block among the blocks and (i-2) a predetermined threshold number, and (ii) a predetermined threshold time and (II-2) if one of the optimization conditions is determined as satisfied, a process of applying at least one storage-optimizing operation to one or more target blocks and a process of generating or updating a genesis block that is a replacement block, which replaces a latest one of the target blocks as subjects to which the storage-optimizing operation is applied, the genesis block serving as a seed block capable of defining relationship between the target blocks and a first one of untargeted blocks, wherein the replacement block includes information on the target blocks, wherein the first one of the untargeted blocks is a block subsequent to the target blocks, and wherein the target blocks are determined by referring to one of said (i) and said (ii),
wherein, at the process of (I), if a specific block is created while the synchronization with said other service nodes is performed, the processor allows fingerprint function-value information on the specific block to be incorporated into header information of the specific block, and
wherein the fingerprint function-value information on the specific block is created by referring to (i) block function-value information on the specific block and (ii) fingerprint function-value information on its corresponding at least one of preceding blocks, wherein the fingerprint function-value information on said its corresponding at least one of the preceding blocks is created by referring to the block function-value information on at least part of the preceding blocks.

25. The specific service node of claim 24, wherein, while an N-th block is created while the synchronization with said other service nodes is performed, wherein N is an integer, the processor allows fingerprint function-value information on the N-th block to be incorporated into header information of the N-th block, and $$F_N = \text{func}_s(F_{N-1} + H_N) \times s_N$$

wherein the fingerprint function-value information on the N-th block is created according to the equation above, and in the equation, $F_N$ represents the fingerprint function-value information on the N-th block, $F_{N-1}$ represents fingerprint function-value information on an (N−1)-th block, $H_N$ represents block function-value information on the N-th block, $s_N$ represents a salt value corresponding to the fingerprint function-value information on the N-th block, and the specific function $\text{func}_s$ represents a predetermined function which (i) accepts the fingerprint function-value information on the (N−1)-th block and the block function-value information on the N-th block as its input and (ii) outputs a function value, and wherein fingerprint function-value information on a 1-st block is created by referring to block function-value information on the 1-st block.

26. The specific service node of claim 24, wherein, at the process of (II), if the specific block is selected as one of the target blocks, the processor performs or supports another device to perform a process of updating the information on the genesis block via the storage-optimizing operation by further referring to information on the specific block including the fingerprint function-value information on the specific block.

27. The specific service node of claim 24, wherein the processor provides fingerprint function-value information on the genesis block, included in the information on the genesis block, to each of said other service nodes, to thereby support each of said other service nodes to verify as to whether each piece of data included in each of the service nodes originates from a same data chain as that of the specific service node.

28. A specific service node among one or more service nodes, included in a blockchain network wherein the specific service node is configured to optimize a storage of the specific service node if one of one or more optimization conditions is satisfied, for providing the blockchain network capable of optimizing storages used by the service nodes in the blockchain network, comprising:
at least one memory that stores instructions; and
at least one processor configured to execute the instructions to perform or support another device to perform: (I) a process of generating blocks while performing synchronization with one or more other service nodes included in the blockchain network, and (II) (II-1) a process of determining whether one of the optimization conditions is satisfied, by referring to one of (i) (i-1) a latest-block number of a latest block among the blocks and (i-2) a predetermined threshold number, and (ii) a predetermined threshold time and (II-2) if one of the optimization conditions is determined as satisfied, a process of applying at least one storage-optimizing operation to one or more target blocks and a process of generating or updating a genesis block that is a replacement block, which replaces a latest one of the target blocks as subjects to which the storage-optimizing operation is applied, the genesis block serving as a seed block capable of defining relationship between the target blocks and a first one of untargeted blocks, wherein the replacement block includes information on the target blocks, wherein the first one of the untargeted blocks is a block subsequent to the target blocks, and wherein the target blocks are determined by referring to one of said (i) and said (ii),
wherein, at the process of (II), the processor performs or supports another device to perform (i) a process of selecting the target blocks, which are to be optimized, whose block numbers are continuous, such that a ratio of (i-1) the number of one or more unoptimized blocks, to which the storage-optimizing operation is not applied, among the blocks stored therein to (i-2) the predetermined threshold number is less than or equal to a preset value, (ii) a process of executing the storage-optimizing operation by (ii-1) deleting the target blocks, and (ii-2) selecting a latest target block whose block number is largest among the target blocks, and (iii) a process of updating the information on the genesis block by referring to information on the target blocks.

* * * * *